(12) United States Patent
Brunn et al.

(10) Patent No.: US 11,144,733 B2
(45) Date of Patent: *Oct. 12, 2021

(54) TASK-ORIENTED MESSAGING SYSTEM

(71) Applicant: International Business Machines Corporation, Armonk, NY (US)

(72) Inventors: Jonathan F. Brunn, Logan, UT (US); Jonathan T. Coffey, Brockton, MA (US); Mark A. DuFresne, New Ipswich, NH (US); Marit L. Imsdahl, Cary, NC (US); Christopher D. Johnson, Ayer, MA (US); Asima Silva, Holden, MA (US); James J. Stadtmiller, Hudson, NH (US); Razeyah Stephen, Marlboro, MA (US); Yuriy B. Veytsman, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/151,874

(22) Filed: Oct. 4, 2018

(65) Prior Publication Data

US 2019/0034420 A1    Jan. 31, 2019

Related U.S. Application Data

(63) Continuation of application No. 15/197,873, filed on Jun. 30, 2016, now Pat. No. 10,140,291.

(51) Int. Cl.
*G06F 3/0482* (2013.01)
*G06F 40/42* (2020.01)
(Continued)

(52) U.S. Cl.
CPC ............ *G06F 40/42* (2020.01); *G06F 3/0482* (2013.01); *G06F 3/0484* (2013.01);
(Continued)

(58) Field of Classification Search
CPC ...... G06Q 10/10; G06Q 50/01; G06Q 10/107; G06Q 30/02; G06Q 10/1097;
(Continued)

(56) References Cited

U.S. PATENT DOCUMENTS 6,003,020 A    12/1999 Hazlehurst et al.
8,407,781 B2    3/2013 Doi
(Continued)

FOREIGN PATENT DOCUMENTS

WO    2008026001 A1    3/2008
WO    2013003100 A3    1/2013

OTHER PUBLICATIONS

Appendix P List of IBM Patents or Applications Treated as Related. Two Pages. Dated Oct. 4, 2018.

*Primary Examiner* — Tuyetlien T Tran
(74) *Attorney, Agent, or Firm* — Peter J. Hackman; Stephen. R. Yoder; Brian M. Restauro

(57) ABSTRACT

Task-oriented messages are presented to a user in an interactive format for disposition. Natural language processing techniques parse task-oriented messages for individual tasks, such as assignments, information requests, and requests for approval or authorization. A user interface provides a recipient of a task-oriented message with selectable tasks for individual, or group, disposition, such as respond, defer, delegate, mark answered, and ignore. Recipients are notified if an incomplete response is generated, such as when an identified task is not dispositioned.

15 Claims, 5 Drawing Sheets

| RESPOND | DEFER | IGNORE | TASK SUMMARY | SUBMIT |
|:---:|:---:|:---:|---|:---:|
| ● | ○ | ○ | WHAT IS THIS DIRECTORY INTENDED FOR? | |
| ● | ○ | ○ | WHY IS STEP 2B COMMENTED OUT OF THE LOADER SCRIPT? | |
| ○ | ● | ○ | WHEN WILL THE UPDATED BUILD BE AVAILABLE? | |
| ○ | ● | ○ | WHO HAS BEEN ASSIGNED TO THE TASK OF DOCUMENTING THE CHANGES? | |
| ○ | ○ | ● | ALICE, HAS BOB PROVIDED YOU WITH THE UPDATED SPECIFICATIONS? | |

500

(51) Int. Cl.
*H04L 12/58* (2006.01)
*G06F 3/0484* (2013.01)
*G06Q 10/10* (2012.01)
*G06F 40/279* (2020.01)

(52) U.S. Cl.
CPC ........ *G06F 3/04847* (2013.01); *G06F 40/279*
(2020.01); *G06Q 10/1097* (2013.01); ***H04L
51/04* (2013.01); *H04L 51/046*** (2013.01);
*H04L 51/34* (2013.01); *H04L 51/22* (2013.01);
*H04L 51/32* (2013.01)

(58) Field of Classification Search
CPC ..... H04L 65/403; H04L 51/04; H04L 51/046;
H04L 51/34; H04L 51/32; H04L 51/22;
G06F 3/0481; G06F 3/04842; G06F
3/0482; G06F 3/0484; G06F 3/04817;
G06F 40/42; G06F 40/279; G06F
3/04847
See application file for complete search history.

(56) References Cited

U.S. PATENT DOCUMENTS

| | | | |
|---|---|---|---|
| 8,812,982 B2 | 8/2014 | Ross | |
| 8,898,234 B2 | 11/2014 | Ahern et al. | |
| 9,177,127 B1 | 11/2015 | Dotan et al. | |
| 9,614,804 B2 | 4/2017 | Myles | |
| 2003/0101153 A1 | 5/2003 | Francis | |
| 2003/0135659 A1 | 7/2003 | Bellotti | |
| 2004/0119740 A1 | 6/2004 | Chang | |
| 2004/0141004 A1 | 7/2004 | Cabezas | |
| 2004/0217163 A1 | 11/2004 | Savage | |
| 2006/0074844 A1* | 4/2006 | Frankel | G06Q 10/06 |
| 2007/0288576 A1* | 12/2007 | Illg | G06Q 10/107 |
| | | | 709/206 |
| 2007/0288577 A1* | 12/2007 | Kronlund | G06Q 10/107 |
| | | | 709/206 |
| 2008/0034315 A1* | 2/2008 | Langoulant | G06Q 10/107 |
| | | | 715/780 |
| 2008/0109735 A1 | 5/2008 | Vuong | |
| 2008/0126951 A1 | 5/2008 | Sood | |
| 2008/0294637 A1 | 11/2008 | Liu | |
| 2008/0311934 A1 | 12/2008 | Soderstrom | |
| 2009/0216843 A1 | 8/2009 | Willner | |
| 2010/0004921 A1 | 1/2010 | Hufnagel | |
| 2010/0057855 A1 | 3/2010 | Chakra | |
| 2010/0100815 A1 | 4/2010 | Hutchinson et al. | |
| 2010/0268681 A1 | 10/2010 | Guo | |
| 2012/0166075 A1* | 6/2012 | Agrawal | G06Q 10/109 |
| | | | 701/414 |
| 2013/0007144 A1 | 1/2013 | Ahern | |
| 2014/0033071 A1 | 1/2014 | Gruber | |
| 2014/0096033 A1 | 4/2014 | Blair | |
| 2014/0214404 A1 | 7/2014 | Kalia et al. | |
| 2015/0205782 A1* | 7/2015 | Subramanya | G06Q 10/1097 |
| | | | 704/9 |
| 2015/0281156 A1 | 10/2015 | Beausoleil et al. | |
| 2015/0281165 A1 | 10/2015 | Chao | |
| 2015/0312180 A1 | 10/2015 | Taler | |
| 2016/0062605 A1* | 3/2016 | Agarwal | G06F 40/169 |
| | | | 715/752 |
| 2016/0259778 A1 | 9/2016 | Cookson et al. | |
| 2016/0335572 A1 | 11/2016 | Bennett et al. | |
| 2017/0004396 A1 | 1/2017 | Ghotbi | |
| 2017/0063745 A1* | 3/2017 | Banerjee | G06Q 30/0203 |
| 2017/0068934 A1 | 3/2017 | Bos | |
| 2017/0161372 A1 | 6/2017 | Fernandez et al. | |
| 2017/0201471 A1* | 7/2017 | Miklos | G06Q 10/00 |
| 2018/0004731 A1 | 1/2018 | Brunn et al. | |
| 2018/0004732 A1 | 1/2018 | Brunn et al. | |

* cited by examiner

```
SUBJECT: LOADER CODE QUESTION
FROM: ANGELA
TO: BAKER, CHARLIE, ALICE
```

HI GUYS, I'VE INSTALLED A NEW BUILD AND AM GOING TO TRY THE NEWEST LOADER CODE. I HAVE A FEW QUESTIONS:

validateKnowledgeGraphLoadConfig.sh COMES UP WITH AN ERROR (AS IT DID ON THE PREVIOUS BUILD I USED)

MISSING DIRECTORY Data/DiscoveredData/RelData/FBSMALL.

WHAT IS THIS DIRECTORY INTENDED FOR?

WHY IS STEP 2B COMMENTED OUT OF THE LOADER SCRIPT?

I AM INTERESTED IN THE SCHEDULE FOR PROMOTING UPDATES TO THE BUILD. WHEN WILL THE UPDATED BUILD BE AVAILABLE? ALSO, MY TEAM IS INTERESTED IN REVIEWING THE API DOCUMENTATION. WHO HAS BEEN ASSIGNED TO THE TASK OF DOCUMENTING THE CHANGES?

ALICE, HAS BOB PROVIDED YOU WITH THE UPDATED SPECIFICATION?

FIG. 4

| RESPOND | DEFER | IGNORE | TASK SUMMARY |
|---|---|---|---|
| ● | ○ | ○ | WHAT IS THIS DIRECTORY INTENDED FOR? |
| ● | ○ | ○ | WHY IS STEP 2B COMMENTED OUT OF THE LOADER SCRIPT? |
| ○ | ● | ○ | WHEN WILL THE UPDATED BUILD BE AVAILABLE? |
| ○ | ● | ○ | WHO HAS BEEN ASSIGNED TO THE TASK OF DOCUMENTING THE CHANGES? |
| ○ | ○ | ● | ALICE, HAS BOB PROVIDED YOU WITH THE UPDATED SPECIFICATIONS? |

SUBMIT

FIG. 5

TASK-ORIENTED MESSAGING SYSTEM

BACKGROUND

The present invention relates generally to the field of communications, and more particularly to processing certain communications as a set of tasks.

Electronic messaging via mobile devices and personal computers has rapidly become a primary communications tool. Many web applications, whether social media or e-mail services, provide for electronic communications in the form of instant messaging (IM), electronic mail (e-mail), and other messaging platforms supported by the various applications. While some proprietary email systems and webmail systems are in use, many use simple mail transfer protocol (SMTP), an Internet standard for email. Further, instant messaging generally uses proprietary protocols over technical architectures such as peer-to-peer and client-server configurations. Accessing electronic messaging applications for a given user generally requires entering user login credentials for security reasons.

Natural language processing (NLP) is a field of computer science, artificial intelligence, and linguistics concerned with the interactions between computers and human (natural) languages. Generally speaking, NLP systems use machine learning to analyze and derive meaning from textual corpora (that is, sets of textual content), as used herein electronic messages are the textual corpora. Natural language dialog systems create natural interaction mechanisms for human-computer interactions. State of the art rule-based dialog systems rely on manually-developed rules.

Advances in communication technology include identifying an originator of an outgoing message and making assignments and/or tracking ownership of marked questions within the outgoing message and parsing text of an electronic communication to determine questions presented within the text or to identify question-answer pairs within electronic communication chains, or related communications. It is also known to generate an answer-required field in an e-mail message and determining whether an answer to the answer-required field is included in a response.

SUMMARY

In one aspect of the present invention, a method, a computer program product, and a system includes: identifying a set of requests within a message directed to a recipient, wherein the set of requests correspond to a set of tasks; determining that one or more tasks of the set of tasks are not addressed in a reply message from the recipient; composing a task statement that summarizes the one or more tasks; generating an interactive interface including the task statement and a corresponding set of selectable disposition actions for each of the one or more tasks; displaying the interactive interface to the recipient; receiving a selection, from the recipient, of a selectable disposition action for a task of the one or more tasks; and performing the selected disposition action for the task.

In an additional aspect of the present invention, a method, a computer program product, and a system further includes: monitoring, according to a pre-defined schedule, an electronic communication tool for the message directed to the recipient.

BRIEF DESCRIPTION OF THE SEVERAL VIEWS OF THE DRAWINGS

FIG. 4 is a first screenshot view generated by the first embodiment system

FIG. 5 is a first screenshot view generated by the first embodiment system;

DETAILED DESCRIPTION

Figure 1:
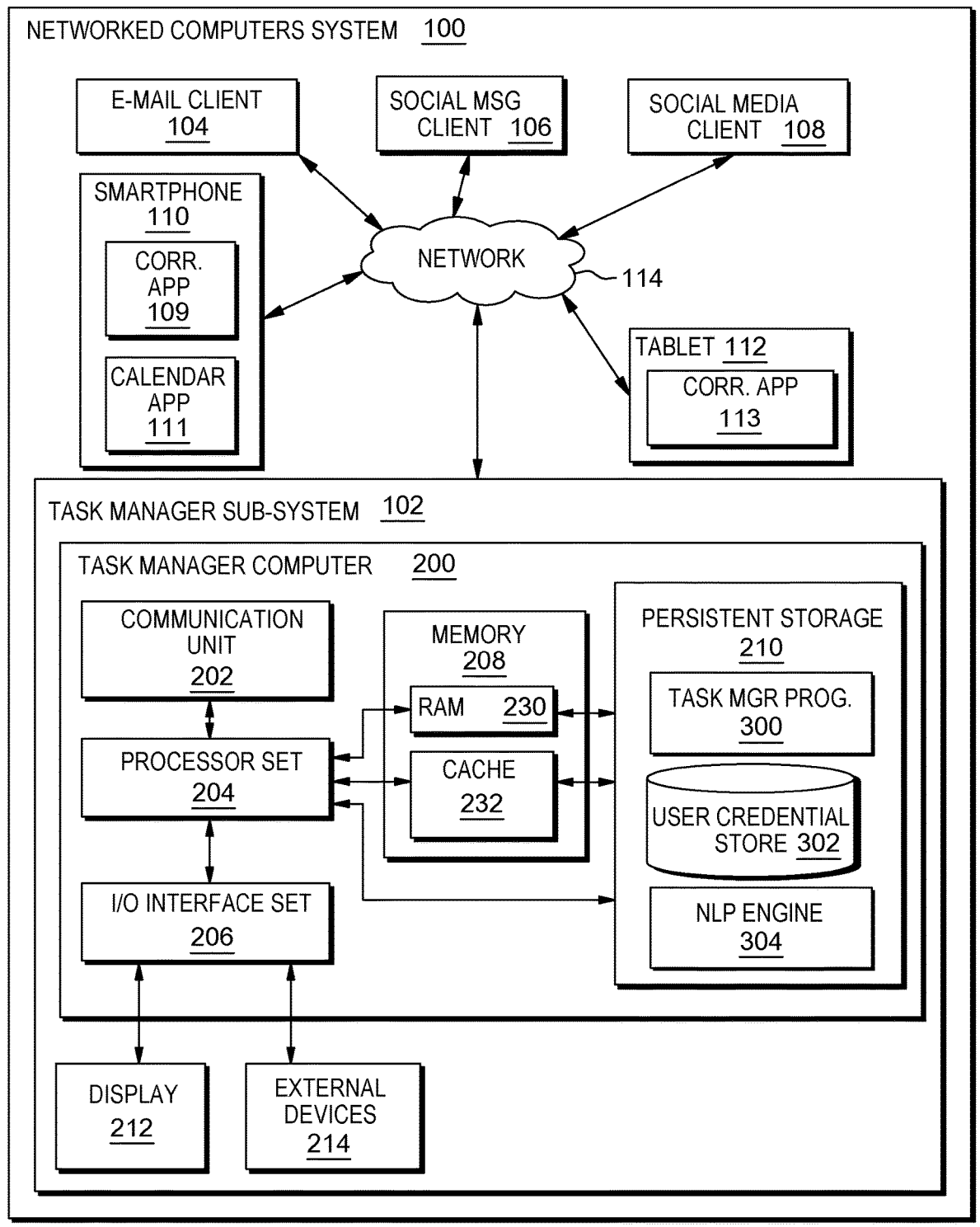
FIG. 1 is a schematic view of a first embodiment of a system according to the present invention.

Task-oriented messages are presented to a user in an interactive format for disposition. Natural language processing techniques parse task-oriented messages for individual tasks, such as assignments, information requests, and requests for approval or authorization. A user interface provides a recipient of a task-oriented message with selectable tasks for individual, or group, disposition, such as respond, defer, delegate, mark answered, and ignore. Recipients are notified if an incomplete response is generated, such as when an identified task is not dispositioned. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: task manager sub-system 102; e-mail client sub-system 104; social messaging client sub-system 106; social media client sub-system 108; smartphone sub-system 110; correspondence applications 109, 113; calendar application 111; tablet sub-system 112; communication network 114; task manager computer 200; communication unit 202; processor set 204; input/output (I/O) interface set 206; memory device 208; persistent storage device 210; display device 212; external device set 214; random access memory (RAM) devices 230; cache memory device 232; task manager program 300; user credential store 302; and NLP engine 304.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Task manager program 300 operates to monitor a set of communications tools for received messages. When messages are received, the task manager program determines if tasks are associated with the message, referred to herein as task-oriented messages. For task-oriented messages, a user interface is generated to present a use with various disposition options, such as respond now, delegate to another user, schedule a time to respond, and ignore task. Some embodiments of the present invention track disposition decisions and reminders are recorded for follow-up when some tasks are not dispositioned.

Some embodiments of the present invention recognize the following facts, potential problems and/or potential areas for improvement with respect to the current state of the art: (i) an e-mail may contain several actionable requests and/or questions; (ii) it is easy to fail to address all actionable items in an e-mail; and/or (iii) oftentimes, a sender engages in a back-and-forth email exchange to get a response to each action item in an initial communication.

Figure 2:
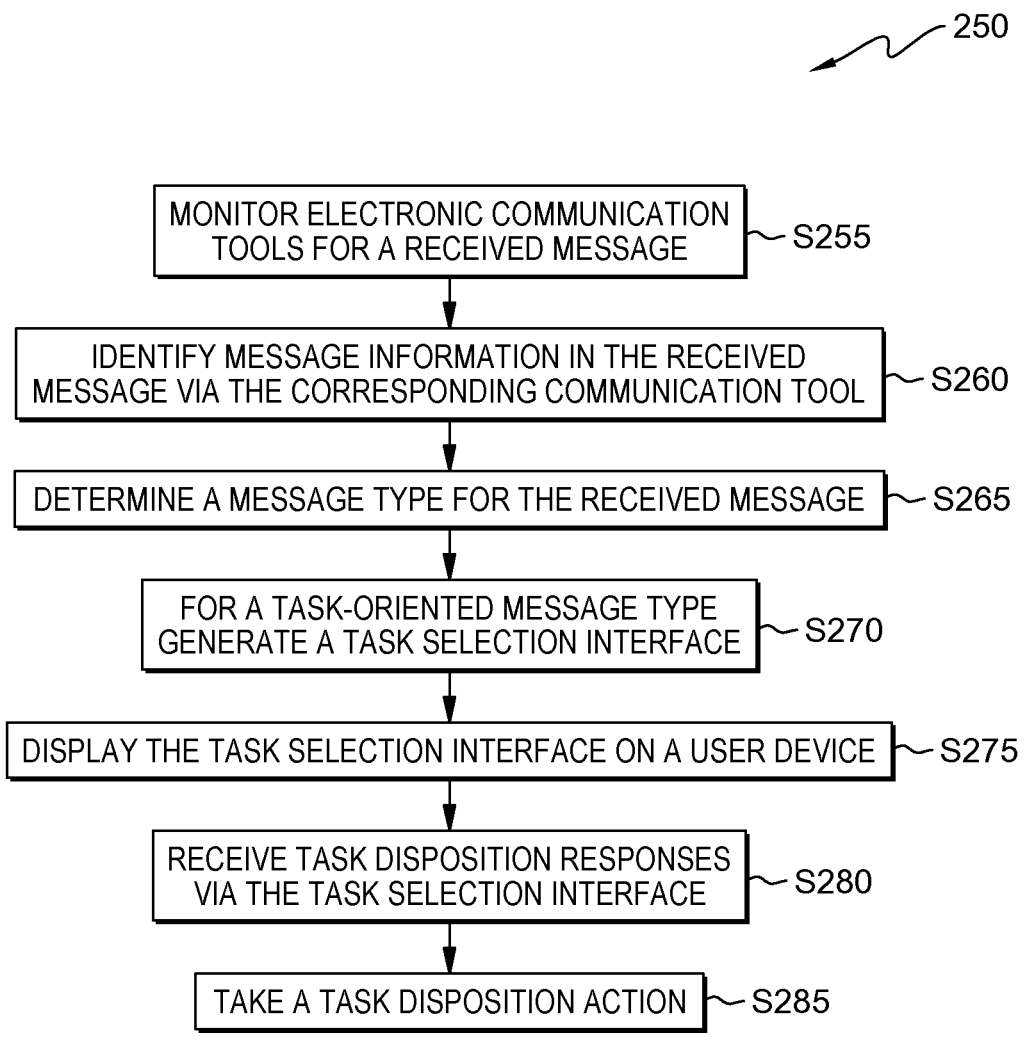
FIG. 2 is a flowchart showing a method performed, at least in part, by the first embodiment system.
Figure 3:
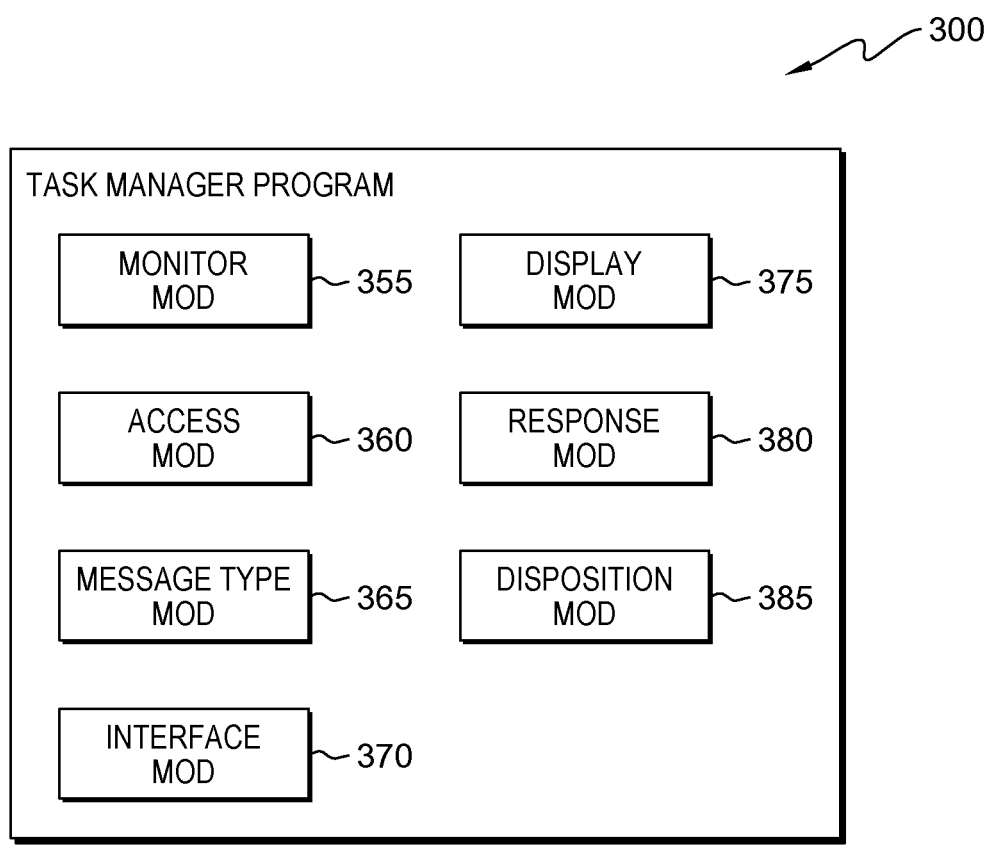
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks). FIGS. 4 and 5 illustrate screenshots generated by some embodiments of the present invention and helpful in understanding the process depicted in flowchart 250.

Processing begins at step S255, where monitor module ("mod") 355 monitors electronic communication tools for a received message. Electronic communication tools are diverse in their application and widely used on various platforms. Essentially, an electronic communications tool provides a user with an environment for exchanging electronic messages, such as email and instant messages, with other users over a networked computers system, such as system 100 in FIG. 1. Examples of communication tools include: (i) instant messaging (IM) servers; (ii) short messaging services (SMS); (iii) web blog; (iv) website; (v) online community, whether public communities, such as FACEBOOK and LINKEDIN, or internal corporate communities operating on an intranet; (vi) news feeds; (vii) email; (viii) VoIP; and (ix) software phones, such as SKYPE and GOOGLE VOICE. (Note: the term(s) "FACEBOOK," "LINKEDIN," "SKYPE," and "GOOGLE VOICE" may be subject to trademark rights in various jurisdictions throughout the world and are used here only in reference to the products or services properly denominated by the marks to the extent that such trademark rights may exist.)

For example, a user may access social messaging client 106 with smartphone 110 over network 114 (FIG. 1). Access is restricted by user credentials, a username and corresponding password, which are stored in user credential store 302 (FIG. 1). The monitor mod accesses the social messaging client using the store user credentials. With that access, the monitor mod checks for messages received from other user using the social messaging client. Similarly, monitor mod accesses other electronic communication tools be using the stored user credentials for the other tools, such as email client 104 (FIG. 1). In this example, monitor module accesses electronic messaging tools on a rotating basis every 10 minutes. This may be illustrated where the e-mail client is accessed at Noon, then the social messaging client is accessed at 12:10 pm, and social media client 108 is accessed at 12:20 pm, and so forth, repeating the pattern of checking the communication tools. Alternatively, monitor mod 355 remains logged into the various tools and receives push notifications from the various communication tools when a message arrives. In that way, task manager program 300 operates to intercept electronic messages as they are received by the various communication tools. Alternatively, a user directs monitor mod 355 to access one or more communication tools to check for received messages. The received messages may be processed in batches each time the monitor mod is directed to access a communication tool.

In some embodiments of the present invention, task manager program operates to receive messages directed to a user from a communication tool and to present the user with the message and any additional checklists or itemized task notice generated according to embodiments of the present invention. In that way, the user only receives messages from certain communication tools after processing is performed by the task manager program. Additionally, filters may employ to quickly handle certain messages based on sender, subject line, etc. The filtering may be established by policy or individually by the user.

Processing proceeds to step S260, where access mod 360 identifies message information in the received message via the corresponding communications tool. In this example, message information includes: (i) the sender identity; (ii) the subject line of the message; and (iii) the body of the message. Other additional information may be obtained including: (i) time of receipt; (ii) recipients; (iii) communication tool that received the message; (iv) message importance indicator; and/or (v) message priority indicator. Message information may be available as meta-data or may be identified through the use of natural language processing (NPL) or may be identified according to certain fields populated in the electronic message, such as the subject line.

Processing proceeds to step S265, where message type mod 365 determines a message type for the received message. Messages that are processed further are those messages qualifying as a particular message type. While the message type of interest is referred to herein as a "task-oriented" message, the filter applied by the message type mod may include criteria specific to the user, such as certain senders may be blocked from further processing or electronic messages having particular importance indicator may be blocked or, alternatively, caused to be processed further. This aspect of the process is highly customizable to the user's needs; however, corporate policy or other requirements may drive the criteria for determining the message type. In this example, a task-oriented message is determined when one or more tasks are identified in the body of the message, as shown in screenshot 400 of FIG. 4. It should be noted that the subject line states "Loader code Question." Some embodiments of the present invention recognize the term "question" in the subject line and for that reason determine that the message type is "task-oriented." Some embodiments of the present invention identify a "task-oriented" message as a message that the sender has indicated as containing tasks to be addressed.

Processing proceeds to step S270, where interface mod 370 generates, for a task-oriented message type, a task selection interface. Natural language processing (NLP) is useful in determining precisely what tasks are included in the task-oriented message. In this example, NLP engine 304 (FIG. 1) processes the message information identified in step S260 to identify what tasks are to be presented via the task selection interface. Alternatively, for a task-oriented message, each paragraph is considered individually as a single "task" to be presented as such on the task selection interface. Alternatively, for a task-oriented message, each sentence is identified for separate processing via the task selection interface. Alternatively, the sender indicates what tasks in the communication are to be addressed and the interface mod generates a task selection interface according or to the sender's indication. Some embodiments of the present invention extract from a message only those tasks that may be directed to the user for whom interface mod is generating the task selection interface. By recognizing, for example, the term "Alice" in the last question of FIG. 4, interface mod 370 does not include that question when generating a selection interface for Baker.

When each "task" is identified, whether through NLP or by other specified rules, the task is associated with selection options. In this example, as shown in FIG. 5, the task selection interface offers the user the option to select "respond," "defer," or "ignore" for each identified task. Additional, fewer, or different options are made available according to user preference, corporate policy, or designer's choice. Other options include: (i) delegate; (ii) open interactive message (answer directly); (iii) to respond via alternative communication tool; and/or (iv) already answered (for example, a face-to-face discussion provided the response).

Oftentimes, identifying the task does not immediately result in a concise statement of the task. In the examples provided herein, such as those shown in FIG. 4, the sender makes statements such as "what is the directory intended for?". Where NLP engine 304 is used to identify tasks in the message, a concise statement of the question may be readily prepared. Accordingly, when preparing the task-selection interface, a statement of the task may not read directly as shown in the electronic message, but may be modified to read more precisely or in a simplified manner. Whether restated or not, the task-selection interface serves to present the user with a summary of the tasks identified within a potentially larger text body found in the original message.

Processing proceeds to step S275, where display mod 375 displays the task selection interface on a user device. In the example screenshots 400 and 500, an email communication is received with the subject line Loader Code Question. The email is addressed to Baker, Charlie, and Alice. As shown in FIG. 5, there are five questions asked of the recipients. This is one example display of the task selection interface according to the present invention. In this example, the user is Baker.

Baker selects "respond" for the first two questions. The selection of "respond" may open the native application for entering a response. However, in this example, correspondence application 109 opens a new window (not shown) containing text entry fields for each task selected as "respond" so the user may enter responses, which are then transmitted over network 114 by the correspondence application to task manager program 300 to be processed by disposition mod 385, discussed below. Similar to the "respond" selection, some disposition options provided to the user via the task selection interface cause additional fields to appear, or to be required, such as when "defer" is selected and an interactive calendar from, for example, calendar 111 in FIG. 1, is presented to the user to select a date for deferral of the response. Baker has selected the next two questions to be deferred. In this example, a reminder is recorded (not shown) in calendar application 111 to prompt the user later to respond to the deferred question. Baker is not going to respond to the last question specifically directed to Alice, so "ignore" is selected. The option "ignore" is useful for some embodiments of the present invention because it is recorded as addressed, which prevents later requests that the task be addressed. Addressing each task is discussed in more detail below and with respect to FIG. 6.

Additional windows or fields are presented to the user according to the selected disposition of a given task. For a further example, when delegate is selected for a task, a drop-down menu is made available for the user to select to whom to delegate the question. In some examples, the drop down menu lists only the other recipients of the communication. Alternatively, the selection of a delegate is made from a corporate address directory or a list of correspondence tool contacts.

Processing proceeds to step S280, where response mod 380 receives task disposition responses via the task selection interface. In this example, when a user completes disposition selections from the options presented in the task selection interface, a submit button is selected and actions are taken according to the selected disposition selections. Alternatively, upon selection of a disposition for each task, the response mod begins to process the dispositions and to present secondary selection fields and/or text boxes for certain tasks.

Processing ends at step S285, where disposition mod 385 takes task disposition action(s). When the task dispositions are determined and secondary data is collected based on the various dispositions selected, the disposition mod takes the action corresponding to each disposition. Actions taken at task disposition vary greatly according to the selected disposition, the user preferences, and/or governing policies. In this example, text entries received from Baker for the first two questions are sent back to the sender via a reply communication through the corresponding communication tool. Further, the two questions that are selected to be deferred are placed on Baker's calendar by disposition mod 385 on calendar application 111 with a reminder set 2 hours before the deferred date and time.

Some embodiments of the present invention, as discussed in more detail below, monitor an electronic message for complete responses. When a reply is sent to the sender, any questions that are deferred, ignored, or otherwise not responded to in the reply are flagged to the recipient as not addressed. The recipient may then consider whether or not this is acceptable and send the reply or see that additional responses are entered. In some embodiments of the present invention, messages not deemed to be "task-oriented messages" may prompt an inquiry as described in more detail below and with respect to FIG. 6.

Further embodiments of the present invention are discussed in the paragraphs that follow and later with reference to FIG. 6.

Some embodiments of the present invention parse electronic correspondence to identify tasks from the text of the correspondence such as questions and requests for action. The recipient is alerted during reply to the correspondence which, if any, of the identified tasks are unaddressed. Any remaining unaddressed tasks are reported as such to the sender upon receipt of the response from the recipient. Additionally, some embodiments of the present invention extract the task from the text and a user interface is generated presenting the tasks as a selectable list of tasks for addressing.

Some embodiments of the present invention analyze a reply to an electronic message for responses to each question in the received communication. In that way, users are able to keep better track of which questions from another person's email they have answered and which they still need to address.

Some embodiments of the present invention provide for a sender to mark certain tasks in an electronic message as required to be addressed so that a recipient is prompted to address those tasks prior to replying to the message. Alternatively, a review checklist is provided to the recipient that identifies which required tasks are not recognized as being addressed.

Some embodiments of the present invention inform the recipient of the electronic message the number of tasks identified in the message and an interactive query as to what action to take with regard to each identified task. In some embodiments, the information is provided to the recipient when the recipient begins drafting a reply to the message. In some embodiments, the information is provided to the recipient upon receipt of the message.

Some embodiments of the present invention use NLP to identify potential questions within the text of an electronic message. Some examples of NLP in this environment include: (i) searching for question marks; (ii) finding sentences including a recipients name; (iii) identifying interrogative words in the text; (iv) searching for the terms who, what, when, where, and how; and/or (v) searching for phrases such as "do you/I" and "can you/I."

The following example scenario is provided to illustrate the operation of some embodiments of the present invention. While questions in an email are described in this example, it should be understood by persons skilled in the art that the questions are one example of tasks and that the electronic messaging may be achieved with communication tools other than an email application. This example will also provide context for the discussion of the process shown in FIG. 6, below. In this example, Brian has four questions about the task he is currently working on for his job. Brian decides to send an email to his co-worker, Tom, seeking help by stating his questions. When the email is sent, it is intercepted by a question manager system. A record is generated to indicate that the email contains four questions and a checklist is produced to highlight the four questions. In this example, natural language processing (NLP) is used to determine that there are four questions. As discussed in detail above, there are other alternative methods for determining the count and the text of questions in the email.

The question manager system then allows the email to continue to reach Tom's inbox. When Tom reviews the email, he only answers the first two questions and the last question, not noticing that there is another question in the email. Tom sends a reply email, but it is intercepted by the question manager system. In this example, the question manager sends Tom the checklist for review to confirm that each question is answered. Alternatively, the question manager applies NLP to determine if each of the four documented questions are answered. While in this alternative NLP is used, other techniques may be used to reach the result of identifying whether or not the identified questions are answered in the reply email. When reviewing the checklist, Tom realizes he didn't respond to the third question. In this example, Tom modifies his reply email to include a response to the third question and sends the email again. This time, the question manager system recognizes that the checklist was already provided and sends the email to Brian. In addition to Tom's email, the question manager system sends Brian a confirmation that Tom answered each of the four questions.

In an alternative example, when Tom is shown the checklist he knows that he did not answer the third question because he did not know the answer. Tom sends the same reply, but this time, he checks off the third question as not being answered. In this alternative example, the question manager system sends the reply email to Brian and notifies Brian that the third question is not answered.

Figure 6:
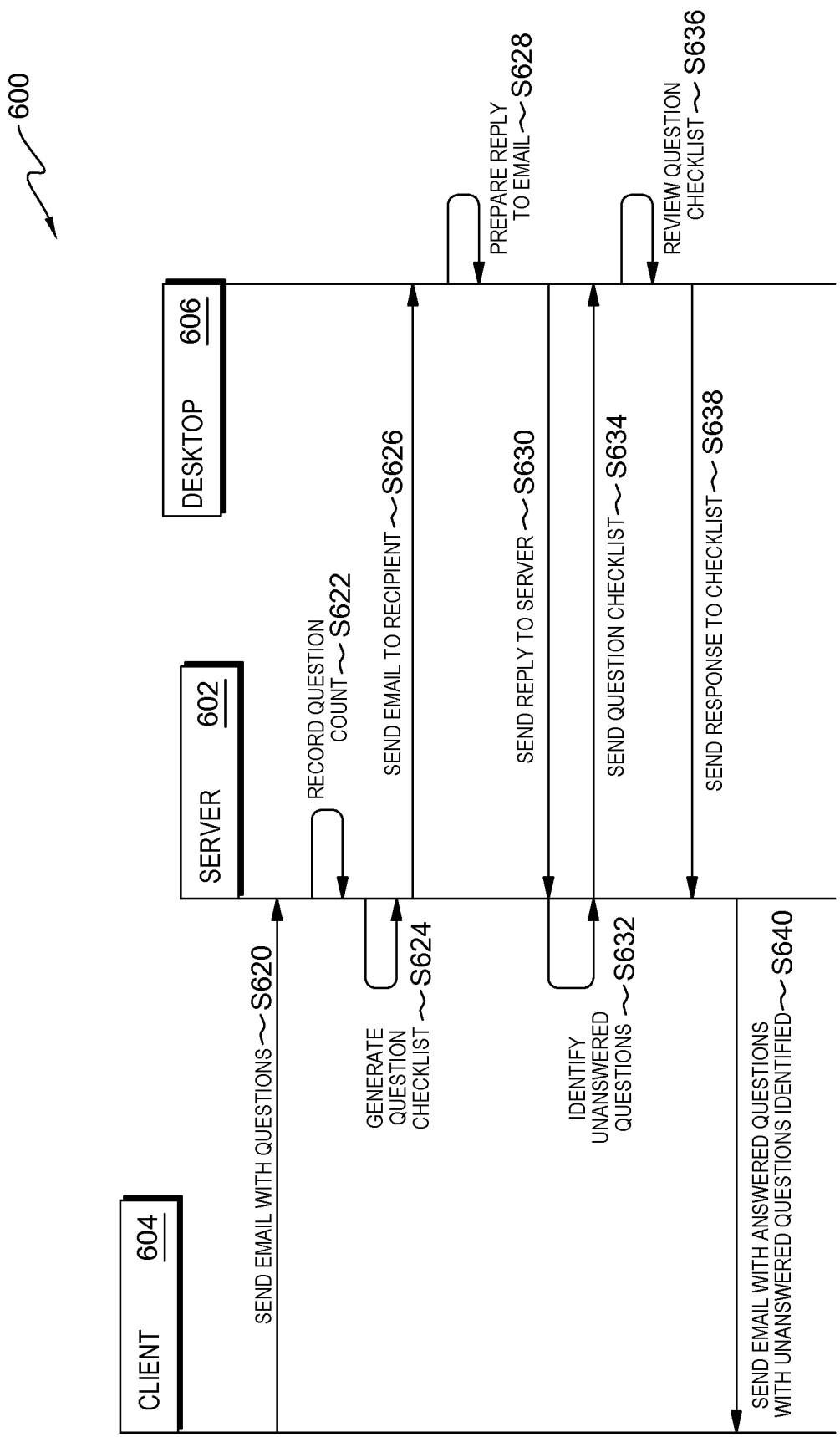
FIG. 6 is a flowchart view of a second embodiment of a method according to the present invention.

FIG. 6 shows flowchart 600 depicting a second method according to an embodiment of the present invention for reminding a sender to reply to each question presented in an email. Within flowchart 600 are three system components, client application 604, server program 602, and desktop sub-system 606. These components may communicate over a network (network 114 of FIG. 1) as individual nodes, but, alternatively, the server program may reside locally with the client application or within the desktop sub-system. This process and associated software will now be discussed, over the course of the following paragraphs. A program to perform the depicted process may be implemented on any operating system, for example: the operating system active on a partition, on the hardware management console, on a network switch, or on a storage controller.

Processing begins at step S620, where a message with a question is sent from the client application and, as shown, is intercepted by the server program. As suggested above, some embodiments of the present invention apply rules to determine when to send a particular message to the server for processing. The rule may be based simply on the subject line of the message including the work "question" as shown in FIG. 4, screenshot 400. Alternatively, all messages are intercepted by the server, but only those having questions are processed according to flowchart 600, while the others are sent to the user via the communication tool. In some embodiments of the present invention, the server accesses the communication tool to identify any correspondence having questions, processes any identified messages, and sends a selection interface to the user via a correspondence application, such as application 109 (FIG. 1).

Processing proceeds to step S622, where the server program determines a question count and records the count for future reference.

Processing proceeds to step S624, where the server program generates a question checklist for the intercepted email. The question checklist operates to highlight the questions within the text of the email. In some embodiments of the present invention, the checklist offers an interactive user interface of selecting and/or marking complete the individual questions.

Processing proceeds to step S626, where the server program releases the intercepted email so that it is sent to the desktop sub-system.

Processing proceeds to step S628, where a user reads the email received from the client application and prepares a reply email including some answers to the questions within the email message.

Processing proceeds to step S630, where the reply email is sent from the desktop sub-system addressed to the client application. As shown, the server program intercepts the reply email.

Processing proceeds to step S632, where answers in the text of the reply message are identified and matched to the questions identified and processed in steps S622 and S624.

Processing proceeds to step S634 when at least one question does not appear to be answered, where the server program sends the question checklist prepared at step S624 to the desktop sub-system for review.

Processing proceeds to step S636, where the user reviews the checklist and prepares an appropriate response. In some embodiments of the present invention, the user notices a question that was overlooked and revises the original email. In other embodiments of the present invention, the user notices a question that was overlooked and provides a response via the checklist, which is later added to the email by the server program. As discussed herein, occasionally a question goes unanswered on purpose. In that case, the user simply marks the question of the checklist as addressed, or otherwise indicates that there are no questions remaining to be answered.

Processing proceeds to step S638, where a response to the checklist is sent from the desktop sub-system to the server program. Again, as stated above, where the server program operates to update the earlier-received email message, the message is updated. Otherwise, upon receipt of the response to the checklist, the server program prepares the email to be sent as well as a report documenting which questions are answered and which questions are not answered.

Processing ends at step S640, where the server program send the reply email and a notice as to unanswered questions to the client application.

Some embodiments of the present invention are directed to a method to encourage a user to address all questions or requests (referred to herein collectively as "tasks") in electronic correspondence. The method includes: (i) receiving a correspondence from a sender by a recipient of the correspondence in a social networking system; (ii) applying natural language processing (NLP) to the correspondence to identify questions [requests]; (iii) responsive to detecting the recipient preparing a response to the correspondence, providing a user interface (UI) to the recipient requesting the recipient to set an answering mode identifying questions to answer including none, some, and all; and (iv) responsive to the recipient setting the answering mode, interacting with the user based on the answering mode.

Some embodiments of the present invention are further directed to a user interface (UI) that provides the recipient with options including answer, defer, delegate, mark answered, and/or ignore.

Some embodiments of the present invention are directed to a method to remind a user to address all questions or requests in electronic correspondence. The method includes: (i) applying natural language processing (NLP) a correspondence from a sender to a recipient in a social networking system to identify questions [requests]; (ii) applying a template to the correspondence to allow a selection for specific questions to be answered; and (iii) responsive to detecting a response to the correspondence without an answer to a question with the selection, prompting the responder to answer the question.

Some embodiments of the present invention are further directed to the selection of specific questions to be answered being performed by the sender.

Some embodiments of the present invention are further directed to the selection of specific questions to be answered being performed by the recipient.

Some embodiments of the present invention are directed to electronic messages communicated via social networking systems including: instant messaging (IM), short message services (SMS), blog, web site, Internet-based community [for example, LinkedIn and Facebook], news feed, email, VoIP, and software phones [for example, Skype, Google Voice].

Some embodiments of the present invention may include one, or more, of the following features, characteristics and/or advantages: (i) ensures recipients of correspondence address all action items; (ii) enumerates the requests in a correspondence and prompts the recipient to address each request; (iii) provides for a user to efficiently process task-oriented communications by highlighting actionable requests (tasks) contained in electronic correspondence, such as e-mail; (iv) improves the likelihood that requests in electronic correspondence are fully answered or addressed; (v) action items are clearly identified for each electronic communication; (vi) completed responses are returned to a requester without requiring follow-up communication from the requester; (vii) identifies, for the requester, which questions, or tasks, are addressed by the recipient; (viii) improves communication between task assignee and assignor; (ix) presents questions to a user in such a way that all questions are addressed; and/or (x) automatically identifies questions presented in an electronic communication to be addressed by a particular recipient.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Natural Language: any language used by human beings to communicate with each other.

Natural Language Processing: any derivation of meaning from natural language performed by a computer.

What is claimed is:

1. A method comprising:
    identifying one or more messages directed to a recipient by monitoring an electronic communication tool according to a pre-defined schedule;
    responsive to identifying a message of the one or more messages, identifying a set of requests within the message directed to the recipient, wherein the set of requests correspond to a set of tasks;
    determining that one or more tasks of the set of tasks are not addressed in a reply message from the recipient;
    composing a task statement that summarizes each task of the one or more tasks;
    generating an interactive interface, independent of the message and the electronic communication tool, which includes the composed task statement and a corresponding set of selectable disposition actions for each task of the one or more tasks;
    displaying to the recipient the message in a first area of a display on a user device of the recipient and the interactive interface in a second area of the display, wherein the first area and the second area are separate areas of the display;
    receiving a selection, from the recipient via the generated interactive interface, a first selectable disposition action for a task of the one or more tasks;
    in response to the first selected disposition action being an ignore instruction, recording the task as being addressed; and
    preventing generation of a subsequent interactive interface that displays the task as needing a second selectable disposition action.

2. The computer-implemented method of claim 1, wherein identifying a set of requests within a message and composing the task statement are performed by natural language processing software.

3. The computer-implemented method of claim 1, further comprising:
    performing a selected disposition action for the task of the one or more tasks which includes;
        displaying a text entry field having a process indicator; and
        responsive to an indication of completion by the process indicator, preparing a responsive communication via the electronic communication tool that includes text entered into the text entry field.

4. The computer-implemented method of claim 1, wherein:
    the selected disposition action is to respond later to the task; and
    further comprising:
        requesting from the recipient a specified date and time for responding to the task;
        retrieving a user credential for access by the recipient to a calendaring program;
        logging into the calendaring program using the user credential; and
        recording on a calendar, for the specified date and time, the task, and a link to the message on an electronic communication tool.

5. The computer-implemented method of claim 1, wherein identifying the set of requests is performed before the message is available to the recipient.

6. A computer program product comprising a computer readable storage medium having a set of instructions stored therein which, when executed by a processor, causes the processor to process task-oriented electronic messages by:
    identifying one or more messages directed to a recipient by monitoring an electronic communication tool according to a pre-defined schedule;
    responsive to identifying a message of the one or more messages, identifying a set of requests within the message directed to the recipient, wherein the set of requests correspond to a set of tasks;

determining that one or more tasks of the set of tasks are not addressed in a reply message from the recipient;

composing a task statement that summarizes each task of the one of more tasks;

generating an interactive interface, independent of the message and the electronic communication tool, which includes the composed task statement and a corresponding set of selectable disposition actions for each task of the one or more tasks;

displaying to the recipient the message in a first area of a display on a user device of the recipient and the interactive interface in a second area of the display, wherein the first area and the second area are separate, non-contiguous areas of the display;

receiving a selection, from the recipient via the generated interactive interface, a first selectable disposition action for a task of the one or more tasks;

in response to the first selected disposition action being an ignore instruction, recording the task as being addressed; and preventing generation of a subsequent interactive interface that displays the task as needing a second selectable disposition action.

7. The computer program product of claim 6, wherein identifying a set of requests within a message and composing the task statement are performed by natural language processing software.

8. The computer program product of claim 6, further comprising:
performing a selected disposition action for the task of the one or more tasks which includes;
displaying a text entry field having a process indicator; and
responsive to an indication of completion by the process indicator, preparing a responsive communication via the electronic communication tool that includes text entered into the text entry field.

9. The computer program product of claim 6, wherein:
the selected disposition action is to respond later to the task; and
further comprising:
requesting from the recipient a specified date and time for responding to the task;
retrieving a user credential for access by the recipient to a calendaring program;
logging into the calendaring program using the user credential; and
recording on a calendar, for the specified date and time, the task, and a link to the message on an electronic communication tool.

10. The computer program product of claim 6, wherein identifying the set of requests is performed before the message is available to the recipient.

11. A computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to process task-oriented electronic messages by:

identifying one or more messages directed to a recipient by monitoring an electronic communication tool according to a pre-defined schedule;

responsive to identifying a message of the one or more messages, identifying a set of requests within the message directed to the recipient, wherein the set of requests correspond to a set of tasks;

determining that one or more tasks of the set of tasks are not addressed in a reply message from the recipient;

composing a task statement that summarizes each task of the one of more tasks;

generating an interactive interface, independent of the message and the electronic communication tool, which includes the composed task statement and a corresponding set of selectable disposition actions for each task of the one or more tasks;

displaying to the recipient the message in a first area of a display on a user device of the recipient and the interactive interface in a second area of the display, wherein the first area and the second area are separate, non-contiguous areas of the display;

receiving a selection, from the recipient via the generated interactive interface, a first selectable disposition action for a task of the one or more tasks;

in response to the first selected disposition action being an ignore instruction, recording the task as being addressed; and preventing generation of a subsequent interactive interface that displays the task as needing a second selectable disposition action.

12. The computer system of claim 11, wherein identifying a set of requests within a message and composing the task statement are performed by natural language processing software.

13. The computer system of claim 11, further comprising:
performing a selected disposition action for the task of the one or more tasks which includes;
displaying a text entry field having a process indicator; and
responsive to an indication of completion by the process indicator, preparing a responsive communication via the electronic communication tool that includes text entered into the text entry field.

14. The computer system of claim 11, wherein:
the selected disposition action is to respond later to the task; and
further comprising:
requesting from the recipient a specified date and time for responding to the task;
retrieving a user credential for access by the recipient to a calendaring program;
logging into the calendaring program using the user credential; and
recording on a calendar, for the specified date and time, the task, and a link to the message on an electronic communication tool.

15. The computer system of claim 11, wherein identifying the set of requests is performed before the message is available to the recipient.

* * * * *